Sept. 24, 1957     H. M. STEPHENSON     2,807,458
CONTROLLED GRADIENT SPRING CARTRIDGE
Filed Feb. 3, 1955     2 Sheets-Sheet 1
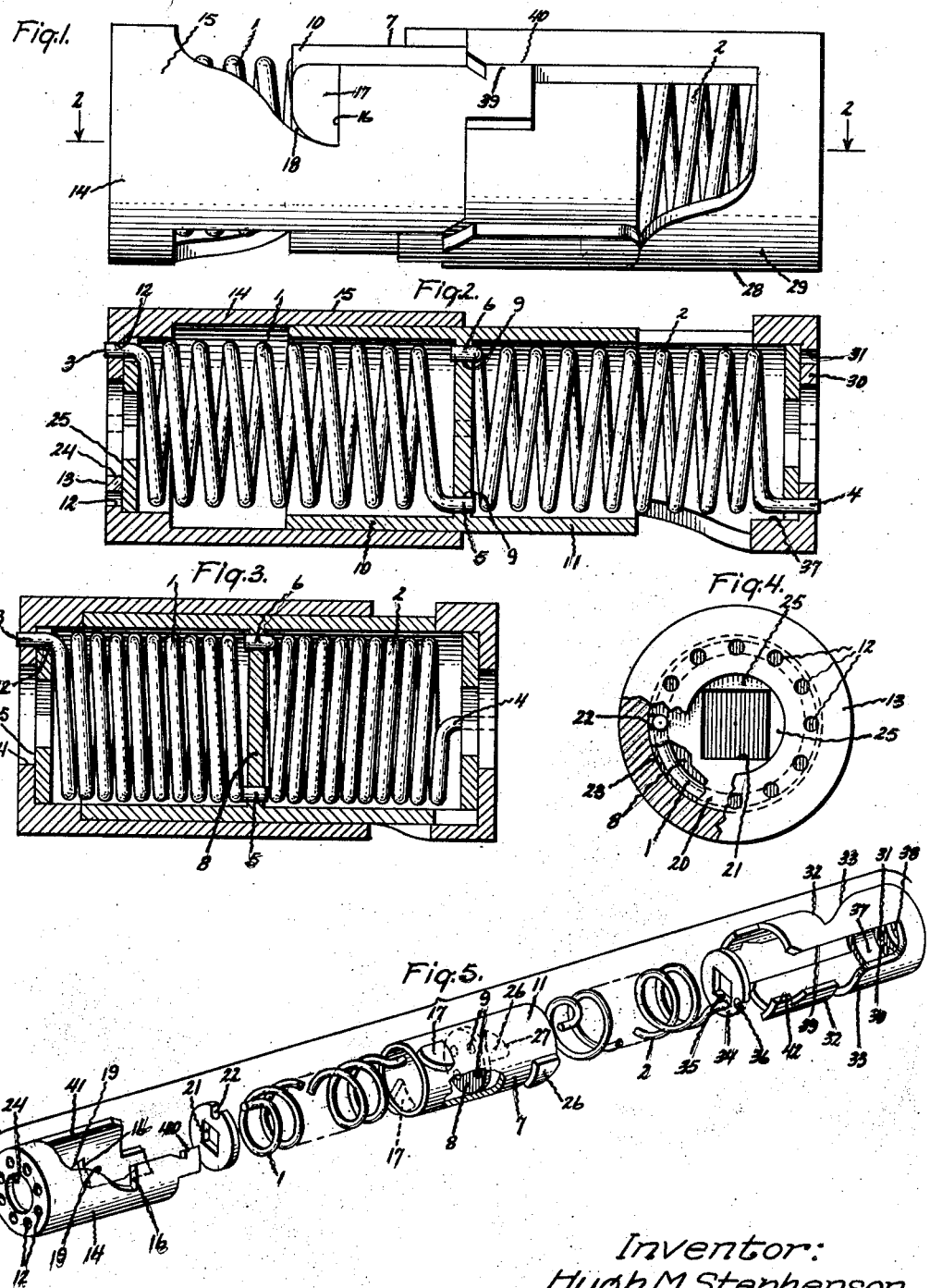
Inventor:
Hugh M. Stephenson,
by *[signature]*
His Attorney.

Sept. 24, 1957  H. M. STEPHENSON  2,807,458
CONTROLLED GRADIENT SPRING CARTRIDGE
Filed Feb. 3, 1955  2 Sheets-Sheet 2
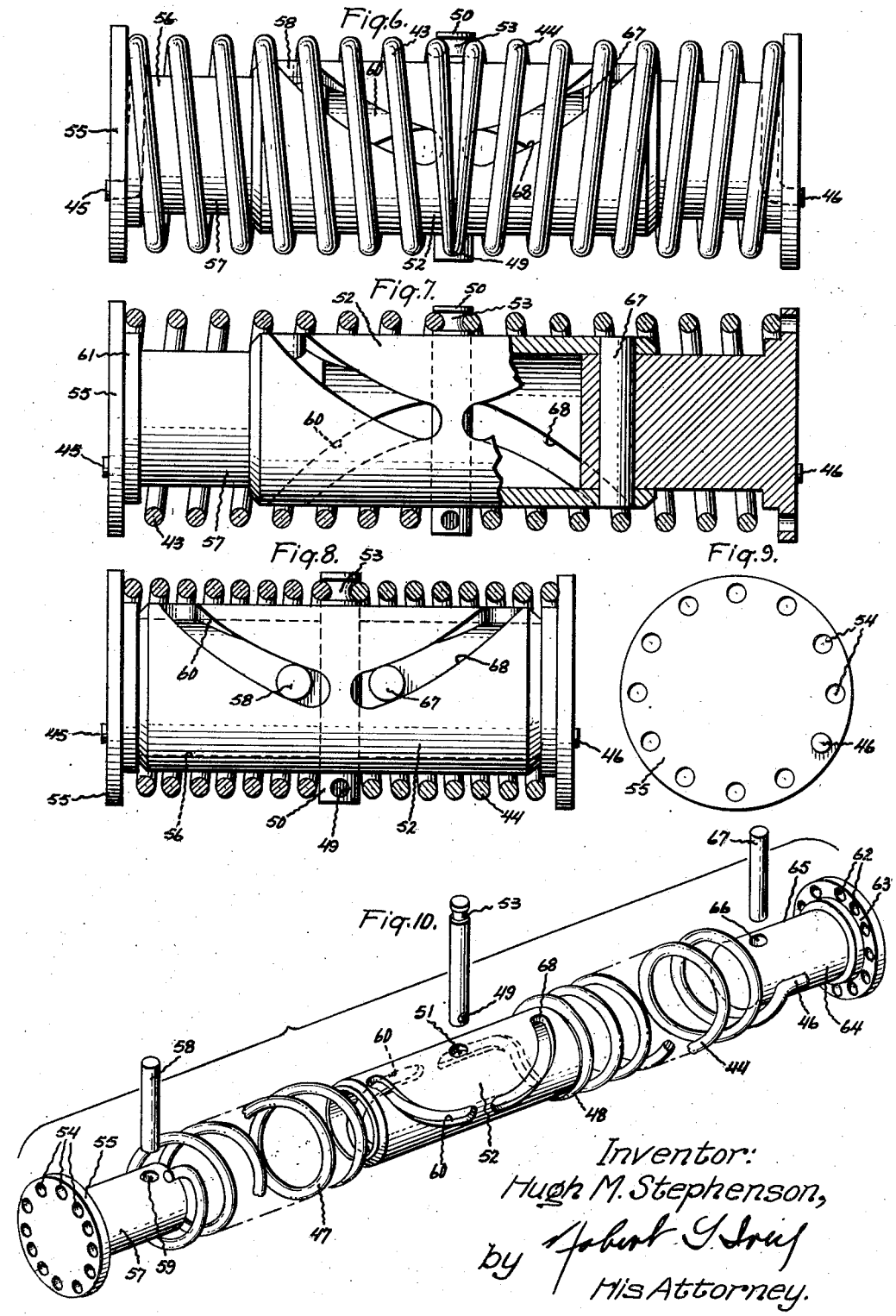
Inventor:
Hugh M. Stephenson,
by
His Attorney.

United States Patent Office 2,807,458
Patented Sept. 24, 1957

2,807,458

CONTROLLED GRADIENT SPRING CARTRIDGE

Hugh M. Stephenson, Fort Wayne, Ind., assignor to General Electric Company, a corporation of New York Application February 3, 1955, Serial No. 485,978

8 Claims. (Cl. 267—1)

This invention relates to springs, and more particularly to means for controlling the spring gradient of helical wound springs.

It is an inherent characteristic of helical wound springs that the force required to compress them increases with the amount they are compressed because of the spring gradient. Thus, for example, where the spring rate is 10 pounds per inch, a pressure of 10 pounds would be required to compress the spring 1 inch, 20 pounds to compress the spring 2 inches, etc. There are many instances where this inherent characteristic becomes a detriment. This may occur for instance, where it is desired that a spring remain fully extended up to a certain pressure but that it become fully compressed when that pressure is reached. In such instances, it is most desirable to have a substantially constant pressure response whereby a predetermined force on the spring will compress the same and the spring will not compress at all until that force is obtained.

It is, therefore, an object of this invention to provide spring means which will incorporate the desirable features set forth above.

Further objects and advantages of this invention will become apparent and the invention will be more fully understood by reference to the following description and the accompanying drawings, and the features of novelty which characterize this invention will be pointed out with particularity in the claims annexed to and forming a part of this specification.

This invention, in its broadest aspect, includes a pair of oppositely wound helical springs positioned substantially in axial alignment. A pair of members are respectively secured to the outer end of each of the springs, and means are secured intermediate the members in rotatable and axially slidable relation therewith. Each of the springs has its inner end secured to the means, which is arranged to rotate a predetermined amount relative to the pair of members for each increment of distance that the means and the pair of members slide relative to each other. The members and the means are so assembled that each of the springs is placed under a predetermined preload compressive stress and under a torsional stress having a predetermined compressive stress vector when the outer ends of said springs are at their maximum distance apart.

In the drawings,

Figure 1 is a top view of the preferred embodiment of this invention;

Figure 2 is a view along line 2—2 in Figure 1, partly in cross section;

Figure 3 is a view along line 2—2, partly in cross section, once the improved spring device of this invention has been placed under compression;

Figure 4 is an end view, partly cut away and partly in cross section, of the improved spring device of this invention;

Figure 5 is an exploded view in perspective of the preferred embodiment;

Figure 6 is a top view of another embodiment of this invention;

Figure 7 is a top view, partly in cross section and partly cut away, of the second embodiment of this invention;

Figure 8 is a top view, partly in cross section, of the second embodiment of the improved spring device after it has been placed in compression;

Figure 9 is an end view of the second embodiment of the invention; and

Figure 10 is an exploded view in perspective of the second embodiment.

Referring now to Figures 1 through 5 of the drawings, the preferred embodiment of the invention will be explained. A pair of helical wound springs 1 and 2 are oppositely wound and positioned substantially in axial alignment. Spring 1 has its end 3 outwardly bent, as shown, and spring 2 has its end 4 similarly formed. The inner adjacent ends 5 and 6 of springs 1 and 2 respectively are formed in the same manner, as shown. A central substantially tubular member 7 is provided with an inwardly extending dividing portion 8 located substantially midway between its ends. Portion 8 acts to divide the member 7 into two separate cup shaped parts 10 and 11, with spring 1 extending into part 10 and spring 2 extending into part 11. A plurality of peripherally spaced openings 9 are formed in portion 8, and the inner ends 5 and 6 of springs 1 and 2 respectively are each positioned in an opening 9. It is deemed generally preferable that ends 5 and 6 be placed in substantially diametrically opposite openings.

Spring 1 is anchored at its other end 3 in one of a plurality of openings 12 provided in the inwardly extending flange 13 forming the end of a member 14. Member 14 has a substantially tubular portion 15 which is provided with a pair of diametrically opposite latching surfaces 16. A pair of projections 17 are formed on the outer surface of part 10 of member 7 and are respectively arranged to latch with surfaces 16 of member 15 so as to maintain members 7 and 14 together in assembled relation. As a consequence of this assembly, it is possible to place spring 1 under any desired amount of compressive preloading by variation of either the characteristic of spring 1 or the total length of the space allowed spring 1 when members 7 and 14 are assembled.

Each projection 17 is provided with a camming surface 18, and member 14 has a pair of cam surfaces formed therein, the cooperation and purpose of which will be explained hereafter. Completing the assembly of the left portion of the improved spring device of this invention as viewed in Figures 1, 2, 3, and 5, there is provided a washer member 20 having a square central opening 21, and a recess 22 formed in its outer periphery. Washer member 20 is proportioned to fit within reduced portion 23 of part 14. End flange 13 of member 14 is provided with a circular opening 24, and when washer 20 is positioned within reduced portion 23 of member 14 the square opening 21 and the circular opening 24 are substantially concentric. Square opening 21 is smaller than circular opening 24, with the result that portions 25 of washer 20 form a shoulder with respect to opening 24. End 3 of spring 1 is arranged to pass through recess 22 in the periphery of washer 20. By rotation of washer 20, spring 1 may be either wound or unwound; since end 3 of the spring may be placed in any one of the plurality of openings 12 provided in end 13 of member 14, any desired predetermined amount of torsional preloading may be placed upon spring 1 either by winding it up or unwinding it. It will be observed that in the present embodiment, movement of washer 20 in a clockwise direction (as seen in Figure 4) will cause an unwinding of the spring 1. Thus, the characteristics of the device may be changed merely by insertion of a tool (not shown) into opening 21 of washer 20 and rotation of the washer and of end 3 of spring 1 until the desired opening 12 and end 3 of the spring are in engagement. The shoulder formed by portion 25 of washer 20 may serve to prevent undesirable excessive entrance of such a tool into the device.

Portion 11 of member 7 is provided with projections 26 which are similar to projections 17 and have similar camming surfaces 27. Projections 26 are preferably offset 90 degrees from projections 17. A member 28 has a tubular portion 29 similar to those parts designated by numbers 14 and 15 respectively, and an end flange portion 30 with a plurality of openings 31 similar respectively to the parts designated by numerals 13 and 12. Portion 29 of member 28 is provided with oppositely disposed latching surfaces 32 similar to latching surfaces 16 and oppositely disposed camming surfaces 33 formed therein similar to camming surface 19. A washer member 34, similar to washer member 20 in that it has a square central opening 35 and a recess 36 formed in its periphery, is arranged to be positioned in a reduced portion 37 formed at the end of member 28. Member 28 is provided with a central opening 38 which cooperates with washer 34 in the same manner that opening 24 cooperates with washer 20. The similar parts described in the last paragraph cooperate with each other in the same manner as those set forth in detail heretofore, so that there is formed a unitary assembly wherein springs 1 and 2 may be placed under any desired compressive preload and torsional preload, the latter being either by winding or unwinding as desired. Surface 39 of member 28 is in sliding engagement with surface 40 of member 14 when the device is assembled, and it will of course be understood that this relationship is repeated at the diametrically opposite point about the periphery of the device. By the same token, surface 41 of member 14 is in sliding engagement with surface 42 of member 28.

The operation of the preferred embodiment of this invention, as set forth in Figures 1 through 5, will now be explained. As previously stated, when the spring device is in the position shown in Figures 1 and 2, both springs 1 and 2 are under a compressive preload which may be predetermined by the characteristics of the spring and the length of the space allotted to the spring. The springs are also under a torsional preload which is determined by the positioning of ends 3 and 4 of springs 1 and 2 respectively in openings 12 and 31. The total compressive preload is the sum of the pure compressive preloading plus a vector of the torsional preloading. When force is applied to the ends of the device, members 14 and 28 will slide upon member 7. The engagement of surfaces 39 and 40 and surfaces 41 and 42 will cause the sliding motion of members 14 and 28 to be directly axial. As members 14 and 28 slide inwardly relative to member 7, springs 1 and 2 are both compressed, and the force required for compression is increased.

Member 7 is caused to rotate relative to both members 14 and 28 due to the engagement of surfaces 27 of projections 26 with cam surfaces 33 of member 28, and the engagement of surfaces 18 of projections 17 with cam surfaces 19 of member 14. The amount of rotation of the member 7 for each increment of distance the springs are compressed is determined entirely by the contour of cam tracks 19 and 33. In the embodiment shown, the engagement of these parts will cause member 7 to rotate in a clockwise direction as viewed in Figure 4 when pressure is applied to the ends of the device. This motion will cause unwinding of both springs 1 and 2 since their ends 3 and 4 respectively are being prevented from rotating and their ends 5 and 6 respectively are being turned at the same time. Where the springs 1 and 2 are so arranged that compression of the device causes unwinding of the springs (as in the subject embodiment), it is deemed preferable that the springs be preloaded to an unwound position in their normally extended positions as seen in Figures 1 and 2. This results from the fact that having springs 1 and 2 pass from a wound position to an unwound position has been found to cause some instability of the device. It will, however, be understood that springs 1 and 2 may be prewound before compression so that they are further wound (rather than unwound) after compression, and that the same general effect will result.

As the springs are unwound, the torsional force increases. However, the only portion of the torsional force which is of any effect is the compression vector. This vector is controlled by the angle to the axis of the springs at which the cam is caused to travel, and is represented by the total torsional force at any given instant multiplied by the tangent of that angle. Thus, the smaller the angle, the smaller the amount of the compression vector of the torsional force, and the smaller will be the amount added to the direct compression force at any given instant. In view of the above, it will be observed that it is possible to cause the sum of the pure compressive force and the compressive vector of the torsional force to total a constant amount through out the travel of the springs thereby resulting in a constant compression device. It will, of course, be understood that the curve of the cam tracks 19 and 33 may be varied so that any desired result may be achieved; thus, a constant pressure device may be provided, or particular programming may be provided, such as first a rise in the pressure needed, then a lowering thereof, etc.

Thus, by providing a proper contour of the cam tracks 19 and 33, it is possible to achieve a constant pressure device so that an even pressure, without either increase or decrease, may cause the device to be compressed from the position shown in Figures 1 and 2 to the position shown in Figure 3. By the same token, if so desired, the force required to continue the movement of the device towards its completely compressed position may be controlled by the cam tracks 19 and 33 so that the force at the end is less than that required at the beginning. It will be seen that this is in direct opposition to the inherent characteristics of helical wound springs which cause the springs to require a certain increase in pressure for each unit of distance the spring is compressed.

Referring now to Figures 6 through 10 of the drawings, the second embodiment of the improved spring device of this invention will be set forth. As before, a pair of helical wound springs 43 and 44 are provided positioned substantially in axial alignment and oppositely wound to each other. Spring 43 has its outer end 45 bent parallel to the axis of the spring, and the same form is given to the outer end 46 of spring 44. The inner ends 47 and 48 of springs 43 and 44 respectively are tapered to a point and inserted in an aperture 49 provided adjacent one end of a pin member 50 which is inserted through a pair of openings 51 in a tubular, or sleeve member 52, the openings being so placed that the pin extends substantially perpendicular to the axis of the member 52. The upper end of the pin is provided with annular groove 53 to accommodate springs 43 and 44 as they approach aperture 49. The outer end 45 of spring 43 is positioned in one of a plurality of openings 54 provided in an outwardly extending flange 55 forming the end of a member 56. End flange 55 is formed substantially perpendicular to the axis of the device and has a diameter greater than that of spring 43. Member 56 is also provided with a cylindrical portion 57 which is arranged to be slidably mounted within sleeve member 52. The two members 52 and 56 are maintained in engagement with each other by means of a pin 58 which extends through an opening 59 in portion 57 of member 56. Member 52 is provided with cam slots 60 through which pin 58 also extends to maintain members 56 and 52 in engagement. It will be clear from the figures that the two cam slots 60 are diametrically opposite each other.

Member 56 is further provided with an enlarged portion 61, intermediate portion 57 and flange 55 in order to provide a guide for the end of spring 43. When the parts are assembled as described above, sleeve member 52 and member 56 are limited to sliding upon each other, and spring 43 will therefore be maintained in compression between the pin 50 at one end and the flange portion 55 of member 56 at the other end. By selecting the opening 54 in which end 45 of spring 43 is placed, the amount of torsional stress placed on the spring may be varied. Also, by varying the characteristics of the spring and the length of members 56 and 52, the amount of compressive preload placed upon spring 43 may be varied.

Openings 62 are formed in an end flange portion 63 of a member 64 in a manner similar to that set forth above for the left end of the device. Member 64 also has a cylindrical portion 65 with an opening 66 through which a pin 67 may be inserted. Portion 65 of member 64 is inserted into sleeve member 52 so that pin 67 will also pass through oppositely disposed cam slots 68 formed in the sleeve member 52. These parts are assembled in the same manner as set forth in connection with the description of the left end of the device, and when the entire assembly is complete, spring 43 is maintained between end flange 55 of member 56 and pin 53, and spring 44 is maintained between end flange 63 of member 64 and pin 53.

The operation of this embodiment of the invention is essentially the same as that set forth in connection with the first embodiment, that is, each of the springs 43 and 44 is preloaded to the desired amount. When a compressive force is placed upon the spring device, members 56 and 64 will tend to slide into sleeve member 52. As they do so, members 56 and 64 will be maintained in non-rotative relation to each other because of the action of pins 58 and 67 in cam slots 60 and 68 respectively. However, the engagement of the pins in the cam slots will cause rotation of sleeve member 52 relative to the end members 56 and 64. As before, the total compressive force needed at any given instant will be that required to place the spring in pure compression plus that required for the compression vector of the torsional stress on springs 43 and 44. This compression vector of the torsional stress will, as before, be the product of the torsional stress multiplied by the tangent of the angle of travel of pins 58 and 67 to the axis of the device. In other words, the lesser the slope, the smaller will be the compressive vector of the torsional force. Since the total compression needed is the sum of the force needed for pure compression and that needed to overcome the compressive vector, slots 60 and 68 may be so formed that the compressive vector of the torsional stress will decrease to the same extent that the compressive stress increases, thereby maintaining a constant spring pressure from the open position of the spring to the completely-compressed position (as shown in Figure 8). As before, it will be seen that it is possible to achieve any spring gradient desired; that is, rather than a constant pressure, the spring pressure may be made to vary as desired by varying the precise contour of the cam slot.

It will be understood that while the springs may be placed under torsional stress either by winding or unwinding, it is deemed preferable that the preloading effect be achieved by winding the springs in the first embodiment (Figures 1, 2, 3, 4, and 5) and by unwinding them in the second embodiment (Figures 6, 7, 8, 9, and 10). This is because, in the first embodiment, unwinding of the springs as the device is placed in compression might cause interference between the springs and the sleeves surrounding them if adequate clearance were not provided, whereas such a mishap is not possible if the spring is caused to wind up in compression. Precisely the reverse is true of the second embodiment, where, if the springs were caused to wind, there might be interference with the sleeve within the springs, whereas that is not possible if the spring is caused to unwind to achieve the torsional stress.

It will be seen from the foregoing that this invention provides a preloaded spring device with which one may obtain any desired spring gradient including a constant pressure and variable pressure gradients. Thus, the inherent character of helical springs has been overcome; despite the fact that it is the nature of a helical spring to require increased pressure per unit distance as it is compressed, the present device permits any desired pressure to be effective at any point during the compression simply by variation of the particular shape of the components.

While this invention has been explained by describing particular embodiments thereof, it will be apparent that improvements and modifications may be made without departing from the scope of the invention as defined in the appended claims.

What I claim as new and desire to secure by Letters Patent of the United States is:

1. A device for providing a controlled spring gradient comprising a pair of oppositely wound helical springs positioned substantially in axial alignment, a pair of members respectively secured to the outer end of each of said springs, and means positioned intermediate said pair of members and secured thereto in rotatable and axially slidable relation therewith, each of said springs having its inner end secured to said means, one of said means on the one hand and said pair of members respectively on the other hand having a pair of cam tracks formed therein, a pair of cam followers provided on the other of said means and said pair of members in engagement with said tracks respectively, said tracks being formed to cause rotation of said means a predetermined variable amount relative to said pair of members for each increment of distance said means and said pair of members slide relative to each other, said pair of members and said means being so assembled that each of said springs is placed under a predetermined preload compressive stress and a torsional stress having a predetermined compressive stress vector when the outer ends of said springs are at their maximum distance apart.

2. A device for providing a controlled spring gradient comprising a pair of oppositely wound helical springs positioned substantially in axial alignment, a pair of members each having a tubular portion terminating in an inwardly extending flange at one end, each of said springs being arranged to extend within the tubular portion of one of said members and to have its outer end secured to the flange of said member, and a third tubular member arranged intermediate said pair of members and secured thereto in rotatable and axially slidable relation with said tubular portions, said springs being respectively arranged to extend within said third member and to have their inner ends respectively secured thereto, one of said pair of members respectively on the one hand and said third member on the other hand having formed thereon a pair of cam tracks, a pair of cam followers provided on the other of said pair of members and said third member in engagement with said cam tracks, said tracks being formed to cause said third member to rotate a predetermined variable amount relative to said pair of members for each increment of distance said third member and said pair of members slide relative to each other, said cam tracks and said springs being so formed that each of said springs is placed under a predetermined preload compressive stress when the outer ends of said springs are at their maximum distance apart, each of said springs having its outer end secured in a position relative to its inner end so that it is placed under a torsional stress having a predetermined compressive stress vector when the outer ends of said springs are at their maximum distance apart.

3. A device for providing an adjustable controlled spring gradient comprising a pair of oppositely wound helical springs positioned substantially in axial alignment having like lengths and characteristics, a pair of members each having a tubular portion terminating in an inwardly extending circular flange at one end, each of said flanges having a plurality of peripherally spaced openings extending therethrough, each of said flanges further defining an opening at an end of each of said members respectively, a pair of washer members respectively positioned within the tubular portions of said members against said flanges, each of said washer members having a recess formed in its periphery and having a centrally located non-circular opening of lesser area than the opening at the end of the member within which it is positioned, each of said springs being arranged to extend within the tubular portion of one of said members and to have its outer end formed to extend through said recess into one of said peripherally spaced flange openings, each of said tubular portions having cut therein a pair of oppositely disposed latch surfaces and a pair of oppositely disposed cam surfaces respectively adjacent said latch surfaces, and a third tubular member slidingly arranged within said pair of tubular portions respectively and intermediate the same, said third tubular member having a pair of oppositely disposed projections formed adjacent each end on its outer surface, said third tubular member further having an inwardly extending part substantially midway between its ends, said inwardly extending part having a plurality of peripherally spaced openings formed therein, each of said springs being arranged to extend into said third tubular member and to have its inner end secured within one of the openings formed in said inwardly extending part, each of said projections being arranged to engage one of said latch surfaces thereby to maintain said device in assembled relation, each of said projections further being arranged to slide along one of said cam surfaces when said pair of members are forced toward each other to compress said springs whereby said third tubular member is caused to rotate an amount predetermined by the shape of said cam surfaces, said springs being arranged to be preloaded in compression when said projections are in engagement with said latch surfaces respectively, said springs further being arranged to have a torsional preload with a compression vector when said projections are in engagement with said latch surfaces, each of said washers being adapted to be forced inwardly and rotated by insertion of a tool into the non-circular opening whereby the torsional preload may be adjusted by moving the outer end of each of said springs to a different flange opening.

4. A device for providing a controlled spring gradient comprising a pair of oppositely wound helical springs positioned substantially in axial alignment having like lengths and characteristics, a pair of members each having a tubular portion terminating in an inwardly extending circular flange at one end, each of said flanges having an opening extending therethrough, each of said springs being arranged to extend within one of said tubular portions and to have its outer end formed to extend into said flange opening, each of said tubular portions having formed therein a latch surface and a cam surface adjacent thereto, and a third tubular member slidingly arranged within said pair of tubular portions respectively and intermediate the same, said third tubular member having a projection formed adjacent each end on its outer surface and having an inwardly extending part substantially midway between its ends, said inwardly extending part having a plurality of peripherally spaced openings formed therein, each of said springs being arranged to extend into said third tubular member and to have its inner end secured within one of the openings formed in said inwardly extending part, each of said projections being arranged to engage a latch surface of one of the pair of members thereby to maintain said device in assembled relation, each of said projections further being arranged to slide along one of said cam surfaces when said pair of members are forced toward each other to compress said springs whereby said third tubular member is caused to rotate an amount predetermined by the shape of said cam surfaces, said springs being arranged to be preloaded in compression when said projections are in engagement with said latch surfaces respectively, said springs further being arranged to have a torsional preload with a compression vector when said projections are in engagement with said latch surfaces respectively.

5. A device for providing a controlled spring gradient comprising a pair of oppositely wound helical springs positioned substantially in axial alignment, a pair of members each having a cylindrical portion terminating in an outwardly extending flange at one end, each of said springs being arranged to extend over one of said members and to have its outer end secured to the flange of said member, and a tubular member arranged intermediate said pair of members and secured thereto in rotatable and axially slidable relation therewith, said springs being respectively arranged to extend over said tubular member and to have their inner ends respectively secured thereto, one of said pair of cylindrical portions respectively on the one hand and said tubular member on the other hand having formed thereon a pair of cam tracks, a pair of cam followers provided on the other of said cylindrical portions and said tubular member in engagement with said tracks, said tracks being formed to cause said third member to rotate a predetermined variable amount relative to said pair of members for each increment of distance said third member and said pair of members slide relative to each other, said cam track and said openings being so formed that each of said springs is placed under a predetermined preload compressive stress when the outer ends of said springs are at their maximum distance apart, each of said springs having its outer end secured in a position relative to its inner end so that it is placed under a torsional stress having a predetermined compressive stress vector when the outer ends of said springs are at their maximum distance apart.

6. A device for providing an adjustable controlled spring gradient comprising a pair of oppositely wound helical springs positioned substantially in axial alignment having like lengths and characteristics, a pair of members each having a cylindrical portion terminating in an outwardly extending circular flange at one end, each of said flanges having a plurality of peripherally spaced openings extending therethrough, each of said springs being arranged to extend over one of said cylindrical portions and to have its outer end formed to extend into one of said peripherally spaced flange openings, each of said cylindrical portions having an opening formed along a diameter thereof, a pin secured within each opening and arranged to extend therefrom at each end thereof, a tubular member slidingly arranged over said cylindrical portions respectively and intermediate the same, said tubular member having a pair of like oppositely disposed closed slots formed therein adjacent each end, said tubular member further having a pair of oppositely disposed openings formed therein substantially midway between its ends, and a pin member secured within said tubular member openings so as to extend from at least one of said openings, said last-mentioned pin member having an aperture formed in its extending portion, each of said springs being arranged to have its inner end secured within said aperture, each end of said first-mentioned pins being arranged to extend into one of said slots and to engage an end thereof thereby to maintain said device in assembled relation, each of the extending ends of said first-mentioned pins further being arranged to slide in one of said slots in a direction predetermined by the shape of the slots when said pair of members are forced toward each other to compress said springs whereby said tubular member is caused to rotate an amount predetermined by the shape of said slots, said springs being arranged to be preloaded in compression when said ends of said first-mentioned pins are in engagement respectively with said ends of said slots, said springs further being arranged to have a torsional preload with a compression vector when said ends of said first-mentioned pins are in engagement respectively with said ends of said slots, the outer end of each of said springs being adapted to be pried out of the flange opening into which it extends and inserted into a different flange opening thereby to adjust the torsional preload.

7. A device for providing a controlled spring gradient comprising a pair of oppositely wound helical springs positioned substantially in axial alignment having like lengths and characterisitcs, a pair of members each having a cylindrical portion terminating in an outwardly extending circular flange at one end, each of said flanges having an opening extending therethrough, each of said springs being arranged to extend over one of said cylindrical portions and to have its outer end formed to extend into said flange opening, each one of said cylindrical portions having an opening formed along a diameter thereof, a pin secured within each opening and arranged to extend therefrom at least at one end thereof, a tubular member slidingly arranged over said pair of cylindrical portions respectively and intermediate the same, said tubular member having a pair of closed slots formed therein respectively adjacent each end, spring end receiving means arranged to project from the surface of said tubular member substantially midway between its ends, each of said springs being arranged to have its inner end secured to said means, each of said pins being arranged to extend into one of said slots and to engage an end thereof thereby to maintain said device in assembled relation, each of said pins further being arranged to slide in one of said slots in a direction predetermined by the shape of the slots when said pair of members are forced toward each other to compress said springs whereby said tubular member is caused to rotate an amount predetermined by the shape of said slots, said springs being arranged to be preloaded in compression when said pins are in engagement respectively with said ends of said slots, said springs further being arranged to have a torsional preload with a compression vector when said pins are in engagement respectively with said ends of said slots.

8. A device for providing an adjustable controlled spring gradient comprising a pair of oppositely wound helical springs positioned substantially in axial alignment, a pair of members each provided with a flange substantially perpendicular to the axis of said springs and respectively arranged with said flanges positioned at the outer end of said springs, each flange having a plurality of peripherally spaced openings formed therethrough, each of said springs having its outer end selectively arranged in one of said spaced openings, and means positioned intermediate said pair of members and secured thereto in rotatable and axially slidable relation therewith, each of said springs having its inner end secured to said means, one of said means on the one hand and said pair of members respectively on the other hand having a pair of cam tracks formed therein, a pair of cam followers on the other of said means and said members in engagement with said tracks, said tracks being formed to cause rotation of said means a predetermined variable amount relative to said pair of members for each increment of distance said means and said pair of members slide relative to each other, said pair of members and said means being so assembled that each of said springs is placed under a predetermined preload compressive stress when the outer ends of said springs are at their maximum distance apart, each of said springs further having a torsional stress with a predetermined compressive stress vector determined by the openings selected for arrangement of the outer ends of said springs.

References Cited in the file of this patent

UNITED STATES PATENTS

| 845,149 | Wands | Feb. 26, 1907 |
|---|---|---|
| 845,150 | Wands | Feb. 26, 1907 |
| 1,519,831 | Goodwin | Dec. 16, 1924 |
| 2,000,905 | Rockefeller | May 14, 1935 |
| 2,565,804 | De Vries et al. | Aug. 28, 1951 |